United States Patent [19]

Isnardi

[11] Patent Number: 5,032,907
[45] Date of Patent: Jul. 16, 1991

[54] VIDEO PANNING SYSTEM FOR WIDESCREEN TELEVISION

[75] Inventor: Michael A. Isnardi, Plainsboro, N.J.

[73] Assignee: General Electric Company, Princeton, N.J.

[21] Appl. No.: 535,217

[22] Filed: Jun. 8, 1990

[30] Foreign Application Priority Data

Dec. 22, 1989 [GB] United Kingdom ............... 8929143

[51] Int. Cl.$^5$ .............................................. H04N 7/04
[52] U.S. Cl. ...................................... 358/141; 358/12
[58] Field of Search ................. 358/141, 12, 140, 214, 358/142

[56] References Cited

U.S. PATENT DOCUMENTS

| | | | |
|---|---|---|---|
| 4,513,324 | 4/1985 | Poetsch et al. | 358/214 |
| 4,581,640 | 4/1986 | Cole | 358/141 |
| 4,651,208 | 3/1987 | Rhodes et al. | 358/140 |
| 4,730,215 | 3/1988 | Jose et al. | 358/140 |
| 4,943,856 | 7/1990 | Bakhmutsky et al. | 358/141 |

OTHER PUBLICATIONS

"Extended Definition Television—The MAC Approach", by M. D. Windham et al., Tenth International Broadcasting Convention, pp. 94–102, Brighton, 1984, published by IEEE.

"Decomposition and Recombination of a Wide Aspect Ratio Image for ENTSC Two-Channel Television", by A. P. Cavallerano, IEEE Transactions on Consumer Electronics, vol. CE-33, No. 3, Aug. 1987, pp. 162–172.

*Primary Examiner*—Victor R. Kostak
*Attorney, Agent, or Firm*—Joseph S. Tripoli; Eric P. Herrmann; Ronald H. Kurdyla

[57] ABSTRACT

A widescreen television system compatible with a lesser aspect ratio standard television system employs a panning operation using a circular-shift method to keep a 4×3 aspect ratio panning window (area of primary interest) centered for display purposes. Illustratively, when the panning window is shifted left by a given amount at the widescreen signal source, a corresponding portion of right sidepanel image information is "cut" and "pasted" alongside left sidepanel image information so that the panning window remains substantially centered with respect to side panel information. A reverse cut-and-paste operation is performed at a widescreen receiver to restore the original widescreen spatial format. A standard 4×3 aspect ratio receiver processes and displays the centered panning window information normally, unaffected by the panning operation at the widescreen signal source.

12 Claims, 4 Drawing Sheets

VIDEO PANNING SYSTEM FOR WIDESCREEN TELEVISION

FIELD OF THE INVENTION

This invention concerns video panning apparatus for use with a widescreen television system which is compatible with a standard television system having a smaller image aspect ratio.

BACKGROUND OF THE INVENTION

A conventional television receiver, such as a receiver in accordance with the NTSC broadcast standard adopted in the United States and elsewhere, has a 4×3 aspect ratio (the ratio of the width to the height of a displayed image). Recently, there has been interest in using higher aspect ratios for television systems, such as 2×1, 5×3 or 16×9, since such higher aspect ratios more nearly approximate or equal the aspect ratio of the human eye than does the 4×3 aspect ratio of a standard television receiver display.

It is desirable for widescreen television systems to be compatible with standard television receivers to facilitate the widespread adoption of widescreen systems. One known compatible widescreen television system is described by M. A. Isnardi et al. in an article "Encoding for Compatibility and Recoverability in the ACTV System", published in *IEEE Transactions on Broadcasting*, Vol. BC-33, December 1987, and in U.S. Pat. No. 4,855,811 of M. A. Isnardi. This known system develops a single channel compatible widescreen television signal which produces a standard 4×3 aspect ratio display when received by a conventional television receiver, and which produces a widescreen 5×3 aspect ratio display when received by a widescreen television receiver.

The widescreen television system proposed by Isnardi was described in the context of a system wherein the compatible 4×3 main image area is horizontally centered on the widescreen image. However, when the main image action is off-center, it may be desirable for the compatible 4×3 NTSC display to follow the main action. That is, it may be desirable to steer the standard 4×3 display area so that it follows the main image action. Such a procedure is well known and is commonly referred to as "panning" or "pan and scan", wherein a panning window follows the main image action. To implement panning, an operator such as a studio technician monitors the widescreen television signal image before transmission, and manually controls the panning window so that it follows the main image action. Such control simultaneously produces a panning control signal representative of the position of the panning window relative to a nominal center position. The control signal can be transmitted with the television signal, e.g., in the vertical blanking interval.

SUMMARY OF THE INVENTION

In accordance with the principles of the present invention, panning is accomplished by performing a so-called circular-shift operation on a widescreen video signal at a transmitter, followed by an inverse circular-shift on a widescreen video signal at a receiver. A panning offset signal indicates the amount of displacement of a panning window from a reference position. In an illustrative embodiment, when a panning window with a 4×3 aspect ratio is shifted left for example, a portion of the right side panel information is "cut" and "pasted" adjacent to the left side panel information so that the 4×3 panning window remains centered for display purposes. A standard aspect ratio receiver processes and displays the centered 4×3 panning window information normally, unaffected by the panning operation at the widescreen source. A reverse circular-shift operation is performed at a widescreen receiver to re-establish the original widescreen spatial format.

Figure 1:
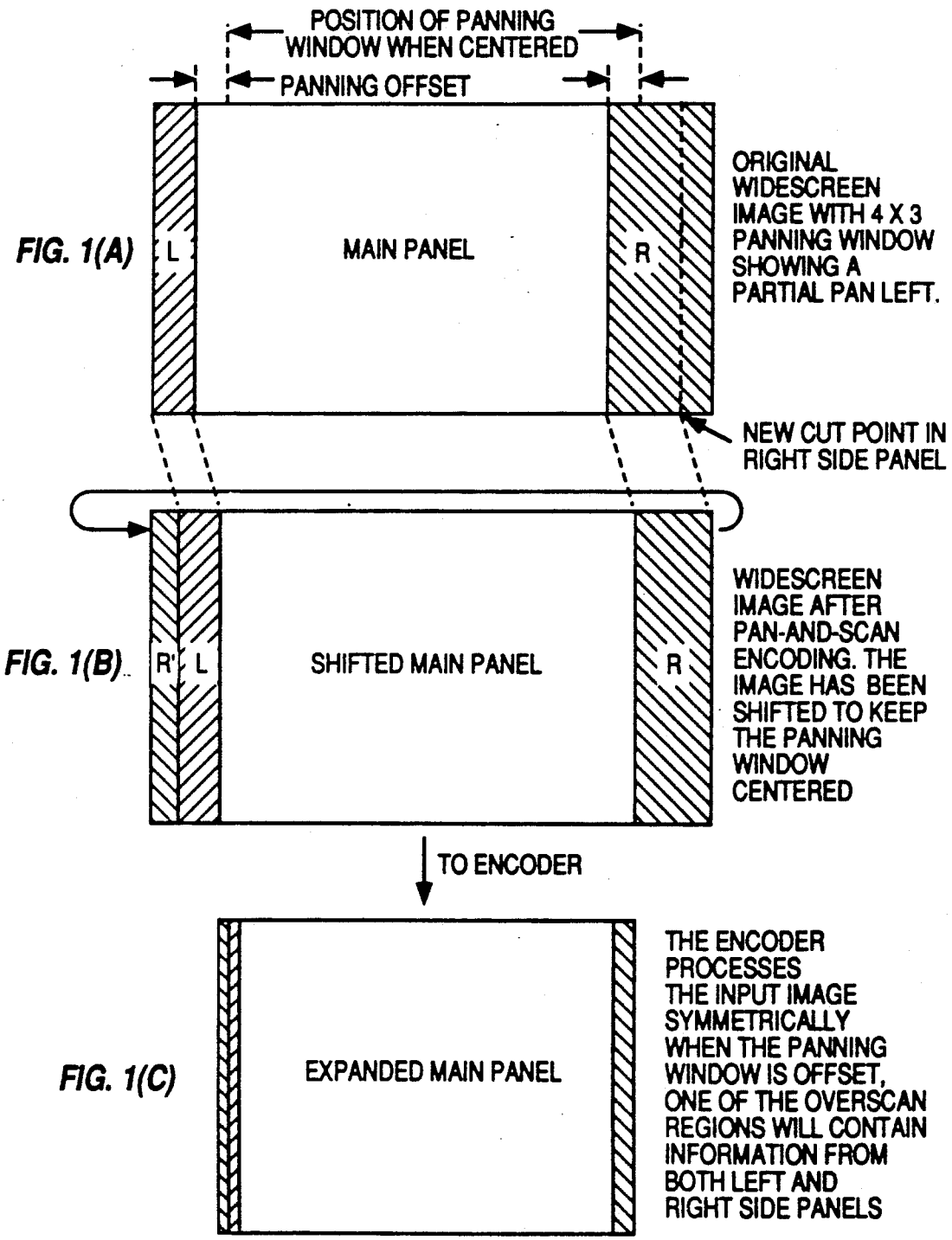
FIGS. 1(A), 1(B) and 1(C) are pictorial representations of the circular-shift panning process according to the present invention.

The disclosed panning system redefines what the encoder and decoder process as center (main) panel information and side panel information. Specifically, in the disclosed panning system the main panel image information is the image information in the panning window.

In FIG. 1(A) illustrates a widescreen image (e.g., with a 16×9 or 5×3 aspect ratio) with a standard 4×3 aspect ratio panning window (main panel area) showing a partial pan to the left. That is, the panning window is shifted left. A panning offset signal representative of the amount by which the panning window is shifted horizontally is generated for each frame of widescreen source material in this example. The panning offset is generated by an operator at a television studio using a manual control to follow the main scene content or action. The panning offset control signal can be transmitted to a decoder in a receiver in a variety of ways, such as a digitally encoded signal on a line in the vertical blanking interval, for example.

As shown in FIG. 1(B), at the encoder the widescreen source image is circular-shifted in the opposite direction so as to keep the image in the panning window centered on the active line. As a result, the widescreen source including the main panel information is shifted horizontally opposite to the panning direction. Thus, in the illustrated example, the main panel image is shifted right when the panning window is shifted left. To accomplish this, the portion of the right side panel image falling outside the active image line after shifting right is "cut" and "pasted" (as R') into the gap produced next to the left side panel, thereby re-centering the 4×3 main panel image as illustrated.

The remainder of the compatible widescreen encoding process operates independently of the panning operation, and assumes a centered main panel component and equal width side panel components. To produce an encoded NTSC compatible widescreen TV signal, low frequency side panel information is time compressed and placed in the horizontal line overscan regions which are normally not intended to be seen by a viewer, as discussed in U.S. Pat. No. 4,855,811 for example and as illustrated by FIG. 1(C). The encoder processes the input signal symmetrically, and the time compressed side panel information remains hidden from view even when the 4×3 portion of the image is panned left or right. When the panning window is offset, one of the overscan regions (the left region in this example) will contain both left and right side panel information.

In the process of encoding the widescreen image of FIG. 1(B) to produce the NTSC compatible image signal represented by FIG. 1(C), the side panel low frequency information is time compressed by a factor of 5 or 6, and the main panel image area is slightly time expanded (e.g., by a factor of about 1.3). The specifics of this procedure are found in previously mentioned U.S. Pat. No. 4,855,811. The spatial relationships of the pictorials shown in FIGS. 1(A), 1(B) and 1(C) are drawn substantially to scale, but the pictorials do not show identical time scales along the horizontal axis. In each case the width of the entire image (one horizontal active scanning line) spans approximately 52 microseconds.

The described circular-shift panning technique using the "cut" and "paste" operation advantageously prevents the area occupied by either side panel region from becoming excessively wide such as in the case of panning full left or full right. In the absence of the disclosed circular-shift technique, the amount of side panel information produced in such a case could be sufficient to extend beyond the overscan regions into the active display region, even after time compression of the side panel information. The disclosed technique prevents this result by substantially equalizing the width of the side panel information on either side of the main panel, thereby keeping the panning window (main panel) centered. At the decoder, the widescreen components are recovered, and an inverse circular-shift operation is performed to spatially realign the image to its original form.

Figure 2:
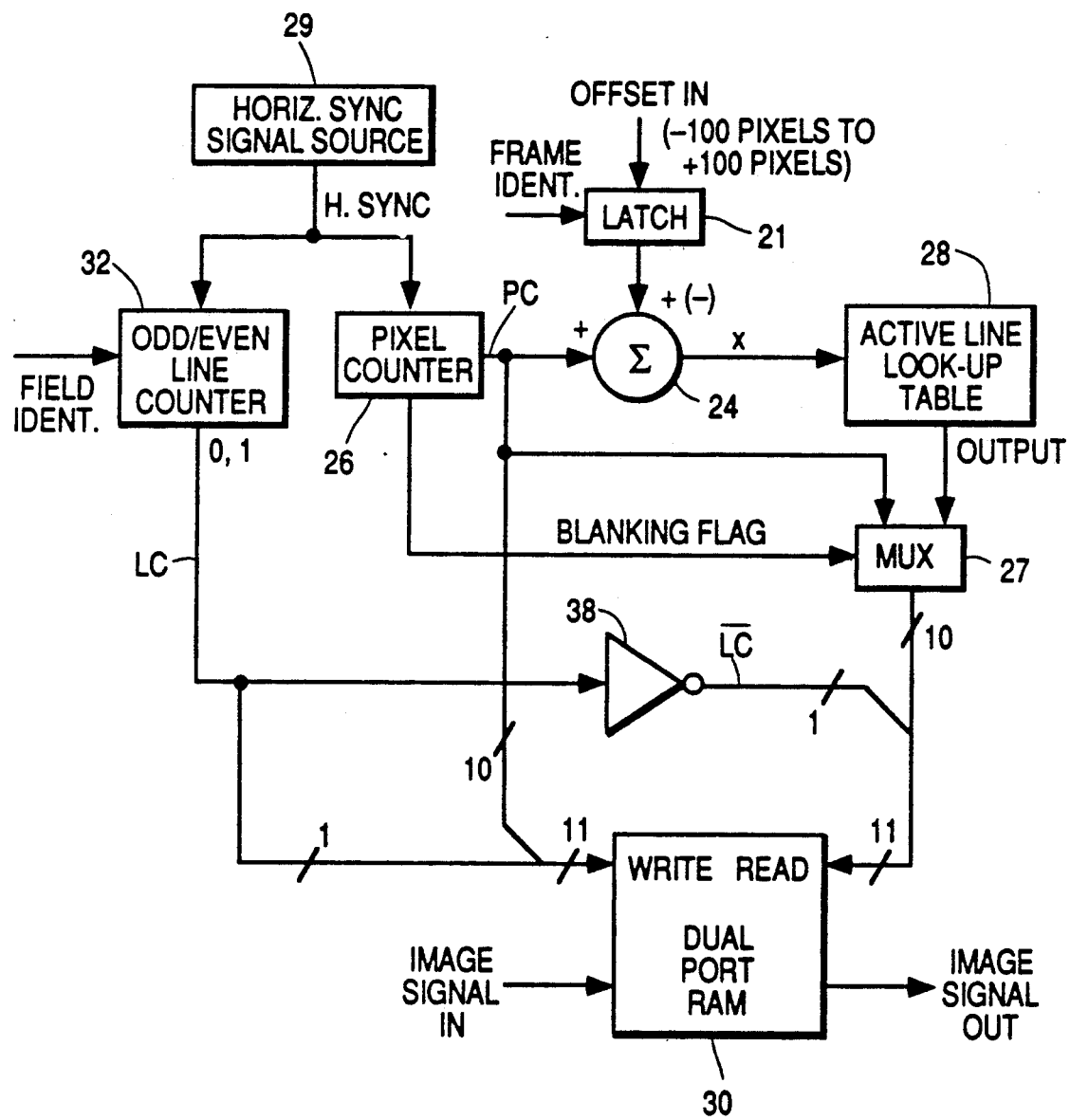
FIG. 2 shows apparatus suitable for performing barrel-shift and inverse circular-shift panning according to the present invention.

FIG. 2 illustrates apparatus which can be used to implement the circular-shift operation at the encoder. With a small modification as will be described, the apparatus of FIG. 2 can perform the inverse circular-shift operation at a decoder. A panning OFFSET control signal in binary form is applied to a frame latch 21 where it is stored for the duration of an image frame. In this example the video signal is in interlaced form so that each frame comprises two image fields, with odd fields containing odd numbered image lines and even field containing even numbered image lines. The OFFSET signal represents the amount of horizontal image shift during panning, and in this example can represent a panning offset of plus or minus 100 pixels from a prescribed centered panning window position. A frame identifier signal (FRAME IDENT) controls the operation of latch 21. Each horizontal line illustratively comprises 910 pixels. Pixels 0–99 encompass the horizontal blanking interval including the sync interval, and pixels 100–909 constitute the active image line interval.

The OFFSET signal appears at the output of latch 21 for a frame period, after which it is up-dated for the next image frame. The OFFSET signal is applied to a non-inverting (+) input of a combiner 24, another non-inverting (+) input of which receives a binary output signal PC from a pixel counter 26. Pixel counter 26 provides an output 0–909 pixel count for every odd and even horizontal scanning line. Counter 26 is a free-running device which is reset at the end of each horizontal line in response to a horizontal sync pulse HORIZ SYNC derived from horizontal synchronizing information present during horizontal blanking intervals of the television signal.

When the panning window is centered, i.e., when there is no panning offset and the output from latch 21 is zero, the value of output signal X from combiner 24 equals the value of an OUTPUT signal from an active line look-up table (PROM) 28. Unit 28 maps values of X that fall off one edge of the active line into values at the other end of the line. Unit 28 passes values of X that fall within the active line (pixels 100–909). The output signal from unit 28 is conveyed via a multiplexer (MUX) 27 to a READ address port of a dual port RAM 30. A WRITE address port of RAM 30 receives output signal PC from pixel counter 26. In the case of a zero panning offset the WRITE address signal is identical to the READ address signal, since the output signal from combiner 24 is equal to the output signal from look-up table 28. The WRITE address port of RAM 30 also receives a control signal from an odd/even line identifier unit 32. The output of unit 32 changes state from one horizontal image line to the next, e.g., a "0" binary output state signifies an odd numbered line and a "1" binary output state signifies an even numbered line. Unit 32 is toggled to change its output state at the start of every line in response to the HORIZ SYNC signal, and also in response to a field identifier signal (FIELD IDENT) which indicates the presence of an odd or an even image field as known. The field identifier signal assures that the output of unit 32 is correct for odd and even fields, e.g., a "0" state will be produced for odd lines associated with odd fields. With identical signals applied to the WRITE and READ address ports of RAM 30, the output signal from RAM 30 corresponds to the input signal of RAM 30, i.e., no circular-shift compensation is provided since there is no panning.

MUX 27 and the associated BLANKING FLAG signal derived from blanking interval sensing circuits associated with counter 26 are optional and are used if it is desired to pass the horizontal blanking interval without being subject to the panning operation. The BLANKING FLAG signal encompasses pixels 0–99 and causes MUX 27 to pass the blanking interval signal component from the output of counter 26 directly. Passing the blanking interval information without a panning offset may be useful where, for example, it is desired to retain a reference point such as an edge of the horizontal synchronizing pulse contained in the blanking interval.

Consider now the case of an offset introduced by pan and scan operation, i.e., the main image action is no longer centered. Recall that, in this example, pixels 0–99 of each horizontal scan line constitute the horizontal blanking interval, and pixels 100–909 constitute the active image interval.

In the case of a pan to the right, the OUTPUT signal from active line look-up table 28 as applied to RAM 30 via MUX 27 begins when the output of pixel counter 26 is representative of pixel 100, the beginning of the active line interval. A pan to the right is assigned a positive (+) polarity, so that a 100 pixel pan to the right is associated with a +100 OFFSET value from the output of latch 21. The value of the OUTPUT signal from look-up table 28 as a function of X can be expressed as $$MOD(X, LP-FP+1)+FP,$$

where MOD (Modulus) is the remainder when X is divided by the value $LP-FP+1$,
$X = PC + OFFSET$,
FP is the first active pixel (100 in this example), and
LP is the last active pixel (909 in this example).

This expression can be rewritten as MOD (X, 810)+100. Thus the value of the output signal from look-up table 28 as applied to RAM 30 at the beginning of the active line interval corresponds to pixel 200, i.e., the original first active pixel value (100) plus the panning offset (100). The READ address of RAM 30 receives from look-up table 28 a signal representative of the total active image pixel values, from 200 through 909, followed by pixel values 100 through 199. Pixel values 100-199 are those which have been "cut" from the left side panel area and "pasted" onto the right side panel area to keep the panning window centered. Thus the image output signal from RAM 30 comprises pixels 200-909 followed by pixels 100-199.

In the case of a pan to the left as illustrated in FIG. 1, the output signal from look-up table 28 as applied to RAM 30 via MUX 27 commences when the output of pixel counter 26 is representative of pixel 810. A pan to the left is assigned a negative (−) polarity, so that a 100 pixel scan to the left is associated with a −100 OFFSET value from the output of latch 21. The value of the output signal from look-up table 28 as a function of X is determined in accordance with the expression given above. In this case the READ address port of RAM 30 receives from look-up table 28 via MUX 27 a signal representative of the total active image pixel values, from pixels 810 through 909 followed by pixels 100 through 809. Pixels 810-909 are those which have been "cut" from the right side panel area and "pasted" onto the left side panel area to keep the panning window centered. Thus the image output signal from RAM 30 comprises pixels 810-899 followed by pixels 100-809.

An inverter 38 is switched at the horizontal line rate to cause a toggle between the memory read and memory write functions of dual-port RAM 30. The output of line counter 32 (LC) represents the most significant bit (MSB) of the WRITE address signal input to RAM 30, and its complement (LC) is the MSB of the READ address signal input to RAM 30. Thus, while new data is being written into one-half of dual port RAM memory, old, circularly shifted data is being read out of the other half of dual port RAM memory.

Figure 3:
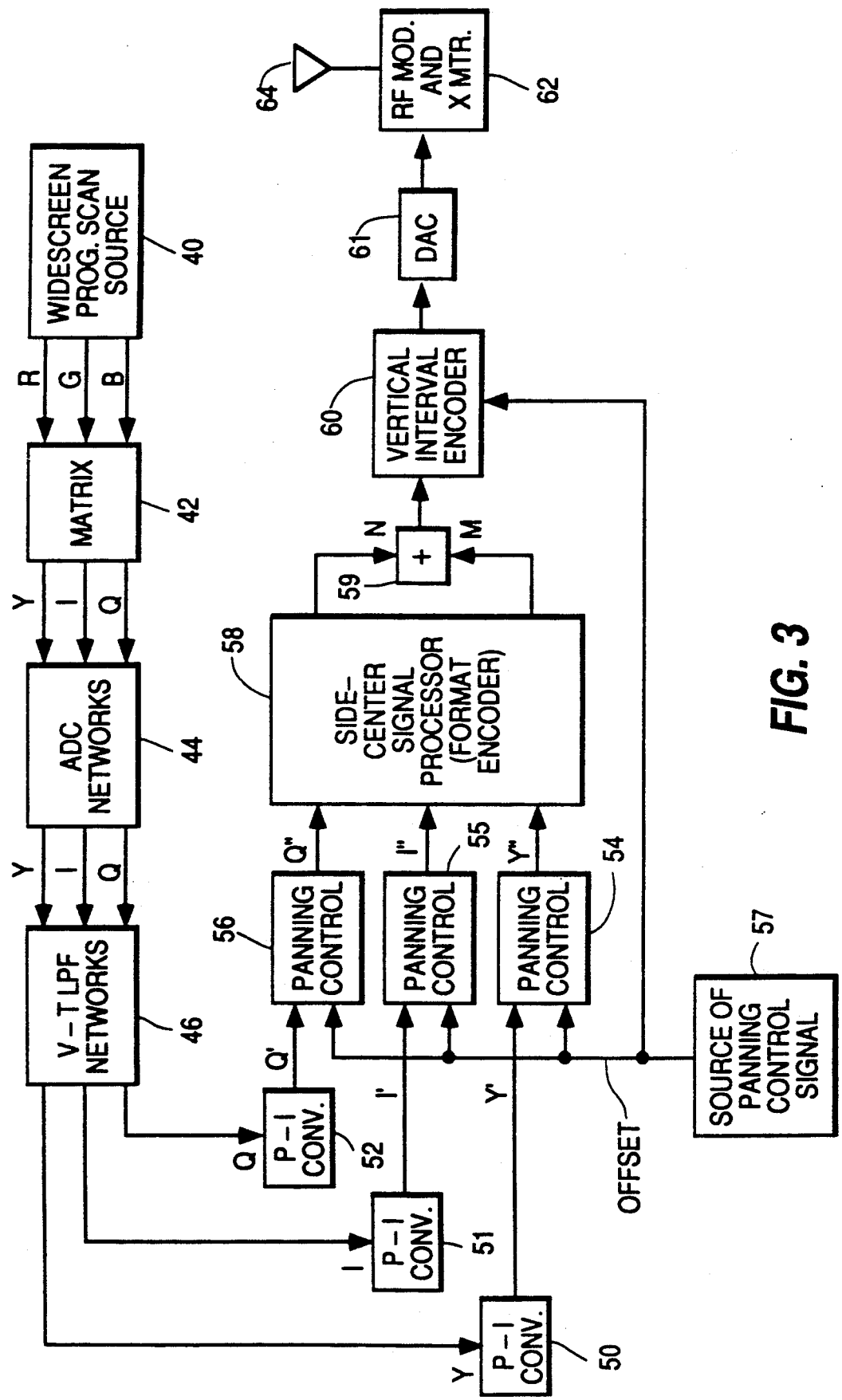
FIG. 3 illustrates a portion of a widescreen television signal encoding (transmitter) system including panning apparatus according to the invention.

FIG. 3 is a block diagram of a system for encoding an NTSC compatible widescreen signal. With the exception of the panning function, this system corresponds to that described in U.S. Pat. No. 4,855,811—Isnardi. Briefly, a 525 line widescreen progressive scan signal source 40 (e.g., a video camera) provides analog widescreen color image components R, G and B to a matrix 42 which converts these components into a luminance component Y, and I and Q color difference components. The Y, I and Q components are converted from analog to digital form by analog-to-digital converter networks 44. The digital Y, I, Q components from converter 44 are filtered individually by separate vertical-temporal (V-T) low pass filters in a unit 46. The Y, I and Q signals from filter network 46 are respectively converted from progressive scan to interlaced scan signals Y', I' and Q' by means of units 50, 51 and 52.

Signals Y', I' and Q' are respectively processed by panning units 54, 55 and 56, each being of the type shown in FIG. 2. Each of the panning units responds to an OFFSET control signal from a source 57, e.g., a control device operated by a studio technician. The OFFSET signal from source 57 is in digital form. The OFFSET signal is encoded in the vertical blanking interval by means of a vertical interval encoder 60. Signals Y'', I'' and Q'' from panning units 54, 55 and 56 are format encoded by means of a side panel and center panel signal processor 58 as described in greater detail in U.S. Pat. No. 4,855,811. An output signal N from processor 58 is a 525 line, 2:1 interlaced NTSC signal with a 4×3 aspect ratio corresponding to the panning window, and having time compressed low frequency side panel information disposed in horizontal overscan regions which are normally not visible to a viewer. An output signal M from processor 58 is an auxiliary signal comprising an auxiliary subcarrier modulated with high frequency side panel information. Signals M and N are combined by an adder 59 to form a 4.2 MHz baseband television signal which is compatible with both standard NTSC receivers and widescreen receivers. After insertion of the panning OFFSET control signal into the vertical blanking interval via encoder 60, the compatible widescreen signal is converted to analog form by a digital-to-analog converter 61. This signal modulates an RF carrier in a unit 62 and is broadcast via an antenna 64.

Figure 4:
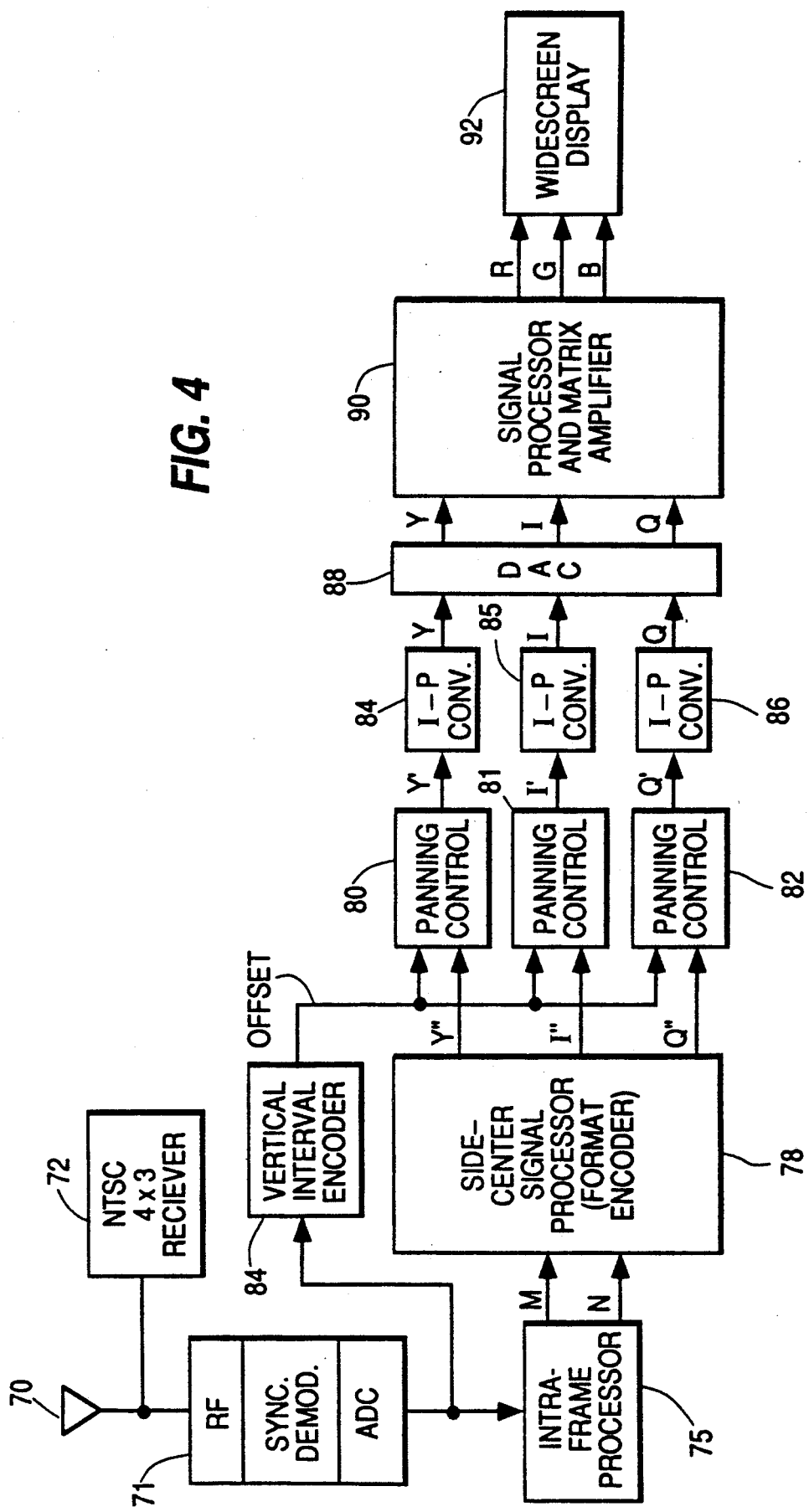
FIG. 4 illustrates a portion of a widescreen television signal decoding (receiver) system including panning apparatus according to the invention.

FIG. 4 illustrates a portion of a widescreen receiver for receiving the compatible widescreen signal broadcast by the system of FIG. 3. The receiver system of FIG. 4 is also described in detail in U.S. Pat. No. 4,855,811, except for the panning function.

A compatible widescreen interlaced television signal is received by an antenna 70 and applied to an antenna input of an NTSC receiver 72. Receiver 72 processes the compatible widescreen signal in normal fashion to produce an image display with a 4×3 aspect ratio, with the encoded widescreen side panel information being unseen by a viewer. The signal received by antenna 70 is also applied to a widescreen receiver, shown in block diagram form, for displaying a video image with a wide aspect ratio, e.g., 5×3 or 16×9. The received signal is processed by an input unit 71 including radio frequency (RF) tuner and amplifier circuits, a synchronous video demodulator for recovering baseband video information, and analog-to-digital (ADC) converter circuits for producing a baseband video signal in digital form.

Signals M and N are recovered by an intraframe processor 75 which averages and differences image lines 262 horizontal lines apart within image frames. Signals M and N are decoded into constituent widescreen components Y''', I'' and Q'' by means of a side-center panel signal processor 78. These signals are respectively processed by panning units 80, 81 and 82, which respond to the OFFSET control signal which is recovered from the vertical blanking interval by a vertical interval decoder 84. Panning units 80, 81 and 82 are each similar to the apparatus shown in FIG. 2, except that the input of combiner 24 which receives the output signal from latch 21 is an inverting (−) input, whereby combiner 24 acts as a subtracter. Panning units 80, 81 and 82 perform the inverse of the barrel-shift operation performed at the encoder, so that the image information of widescreen components Y, I and Q exhibits the original spatial alignment. That is, the panning window exhibits the same spatial alignment relative to the remaining widescreen information as existed at the widescreen source. Standard NTSC receivers process the 4×3 aspect ratio main panel information normally, unaffected by the panning operation at the widescreen signal source.

Output signals Y', I' and Q' from panning units 80, 81 and 82 are converted from interlaced to progressive scan form by converters 84, 85 and 86 respectively, for producing signals Y, I and Q. These signals are converted to analog form by a digital-to-analog converter 88 before being applied to a signal processor and matrix amplifier 90. The video signal processor portion of unit 90 includes signal amplifying, DC level shifting, peaking, brightness control, contrast control and other conventional video signal processing circuits. The matrix amplifier portion of unit 90 combines luminance signal Y with color difference signals I and Q to produce color signals R, G and B. These color signals are amplified by display driver amplifiers in unit 90 to a level suitable for directly driving a widescreen color image display device 92, e.g., a widescreen kinescope.

What is claimed is:

1. In a system for processing a widescreen television-type video signal containing main panel information and side panel information, image panning apparatus comprising:
    panning means for offsetting, by a given amount and in a given direction, an image panning window containing a prescribed image portion of said video signal;
    means for generating an offset signal representative of said given amount and said given direction;
    means for generating an offset signal for shifting a portion of side panel information from one side of said panning window to an opposite side of said panning window so that said panning window remains centered for display purposes.

2. Apparatus according to claim 1, wherein said panning window exhibits an image aspect ratio of approximately 4×3.

3. Apparatus according to claim 1, wherein said widescreen television contains right sidepanel information and left sidepanel information; and said apparatus comprises means for encoding time compressed side panel information in right and left horizontal overscan regions of said television, one of said overscan regions containing both left and right sidepanel information when said panning window is offset.

4. Apparatus according to claim 1, wherein said panning offset is in a horizontal direction.

5. Apparatus according to claim 1, wherein said panning offset signal is updated for every image frame.

6. In a system for receiving a widescreen television-type video signal comprising main panel information and side panel information; apparatus comprising
    input means for providing a baseband signal including a video signal component containing main and sidepanel information, said video signal component subject to having a portion of side panel information shifted from one side of a panning window containing a prescribed image portion of said video signal component to the other side of said panning window to offset said panning window for keeping said panning window substantially centered;
    means responsive to said baseband signal for deriving a panning offset control signal representative of the amount and direction by which said image panning window is offset; and
    means responsive to said video signal component and responsive to said panning offset control signal for shifting said portion of side panel information from said other side of said panning window to said one side of said panning window to restore the original spatial position of said panning window.

7. Apparatus according to claim 6, wherein said shifting means comprises
    memory means having a video signal input, a video signal output, a write address input and a read address input;
    pixel counter means having an output coupled to said write address input;
    programmed memory means having an input for receiving a signal which is a function of said offset control signal, for providing an output signal to said read address input.

8. Apparatus according to claim 7, wherein said shifting means further comprises
    means for combining said offset control signal with an output signal from said pixel counter means for producing said signal which is a function of said offset control signal.

9. Apparatus according to claim 7 and further comprising:
    means for decoupling said output signal from said programmed memory means from said read address input during horizontal blanking invervals.

10. Apparatus according to claim 6, wherein said widescreen television signal contains left side panel information and right side panel information respectively encoded in left and right horizontal overscan regions of said television signal, one of said overscan regions containing both right and left side panel information when said panning window is offset from a centered position in response to said offset control signal.

11. Apparatus according to claim 6, wherein said offset control signal contains information which is updated for each image frame.

12. Apparatus according to claim 6, wherein said panning window exhibits a 4×3 image aspect ratio.

* * * * *